United States Patent Office 2,752,354
Patented June 26, 1956

2,752,354

PROCESS FOR PREPARING CITRAZINAMIDE AND CITRAZINIC ACID

Robert Ginell, Flushing, and Rolf Steinmann, Brooklyn, N. Y., assignors, by mesne assignments, to R. S. Aries & Associates, Inc., New York, N. Y., a corporation of New York No Drawing. Application October 27, 1953,
Serial No. 388,676

16 Claims. (Cl. 260—295)

The present invention relates to an improvement in the processes for preparing citrazinamide and citrazinc acid from citric and aconitic acids whereby increased yields and other economies of operation will result.

Citrazinic acid, 2,6-dihydroxy-4-carboxy-pyridine, has been used as a coupler in the preparation of azo dyestuffs. In addition, it is a versatile intermediate in the preparation of many pharmaceuticals, generally by replacement of the hydroxyl groups. More specifically, citrazinic acid can, by known techniques, be converted to isonicotinic acid, 4-carboxy-pyridine, and in turn to isonicotinic acid hydrazide. This latter compound has found particular utility in the field of anti-tubercular agents.

Heretofore, citrazinic acid has been prepared by heating methyl citrate with ammonia followed by recovery of the acid. Another method involves making a melt of citric acid and urea with subsequent recovery of the acid from the reaction mass. Both methods are characterized by low yields of the order of 30 per cent or less based on the citric acid used. Due to the inherent difficulty in controlling the temperature and reproducing the heating pattern from batch to batch in these techniques, variations in yield and quality will oftentimes result. When these processes are attempted on a larger, commercial scale, additional inefficiencies are introduced because of local overheating. Attempts to correct these deficiencies necessitate the use of costly equipment and carefully controlled operation.

With the growing demand for derivatives of isonicotinic acid it has become necessary to develop more efficient processes for preparation of such intermediates as citrazinamide and citrazinic acid.

It is therefore an object of this invention to synthesize citrazinamide and citrazinic acid by a simple procedure resulting in yields far in excess of 30 per cent.

It is a further object of this invention to synthesize citrazinamide and citrazinic acid in a manner suitable for large scale production while still economical and efficient.

It has now been found that a simple modification of the known techniques will attain these objects. More specifically, we have now found that citric acid can be reacted with urea at elevated temperatures in a solvent medium comprising a substantial amount of an organic polyhydroxy compound to produce yields approximately double those of the conventional processes. Aconitic acid, which is a dehydration product of citric acid, may be used in place of citric acid with substantially similar results. The novel process is simple and readily capable of duplication with similar results with respect to both yield and quality.

Furthermore, we have found that the solvent medium containing unreacted ingredients may be used directly in repetitions of the process with no treatment other than alkalinization.

In the following examples which are illustrative of the practice of this invention, proportions refer to parts by weight unless otherwise specified.

*Example I*

210 parts of citric acid monohydrate and 180 parts of urea are added to 900 parts of ethylene glycol. The mixture is heated to 130° C. and maintained in the range of 130–133° C. for two hours. An additional 100 parts of urea are added and the heating is continued for two hours more. The reaction mass is cooled and 400 parts of water are added. Sulfuric acid is added to the litmus end-point and a crude precipitate settles out. The precipitate is separated from the solvent by filtration and the liquid is saved for re-use as in Example VI. The crude citrazinamide is washed with water. The yield based on citric acid is 55 per cent.

*Example II*

192 parts of anhydrous citric acid and 180 parts of urea are dissolved in 900 parts of ethylene glycol and the solution is maintained at 130–133° C. for two hours, whereupon an additional 100 parts of urea are added. After heating for two hours longer, the mass is cooled and neutralized with dilute hydrochloric acid. The crude citrazinamide precipitate which forms is filtered off and washed with water. This crude citrazinamide is slurried with water and enough sodium carbonate is added to form a solution. The solution is filtered and a slight stoichiometric excess of sodium hydroxide is added to the filtrate. Hydrolysis of the amide is effected by heating on a steam bath for 1½ hours. Upon acidification, citrazinic acid precipitates and is filtered off. After drying, purified citrazinic acid is obtained in a yield of 51 per cent based on the anhydrous citric acid.

*Example III*

Example I is repeated using 900 parts of glycerol as the solvent in place of the ethylene glycol. Citzazinamide is obtained in a yield of 59 per cent.

*Example IV*

Example II is repeated using as solvent 900 parts of a mannitol solution obtained by dissolving 80 g. of mannitol in sufficient water to make each 100 ml. of solution. The yield of citrazinic acid is substantially the same as obtained previously.

*Example V*

174 parts of aconitic acid are dissolved in about 900 parts of glycerol and 180 parts of urea are added. The solution is brought up to 130° C. and maintained between 128° C. and 135° C. for two hours. 100 parts of urea are added and the heating is continued for an additional two hours. Upon cooling and neutralizing with dilute sulfuric acid, crude citrazinamide settles out and is filtered off. This crude material is washed with water and dried producing partially purified citrazinamide.

*Example VI*

The filtrate resulting from separation of the crude citrazinamide precipitate in Example I is made alkaline with aqua ammonia and the procedure of Example I is repeated using this solution as solvent in place of the 900 parts of ethylene glycol. This process is repeated, each time using the filtrate after separation of the citrazinamide as the solvent for the next cycle. The water added prior to or during neutralization is boiled off under the conditions of the reaction. The crude citrazinamide precipitates from seven such cycles are combined and converted to citrazinic acid as in Example II. 701 parts of purified citrazinic acid are obtained representing a 60 per cent yield based on citric acid charged.

The citrazinamide which separates initially is in a crude state but the conversion to the free acid serves also to remove impurities and the citrazinic acid may be used directly for conversion to isonicotinic acid and its derivatives.

While temperatures from about 125° C. to about 140° C. are suitable for conducting the reaction at atmospheric pressure, best results are obtained when the reaction temperature is maintained between 130° C. and 133° C. Pressures varying from sub-atmospheric to several atmospheres may be employed and may be necessary when working with certain solvents but atmospheric pressure is preferred for simplicity of operation.

The proportions of the reactants may be varied considerably but for best results the urea should be used in substantial excess of the amount necessary and it can advantageously be added in stages during the course of the reaction. Since the separation of the crude citrazinamide is a function of pH, any acid may be employed for neutralization of the reaction mass. When a volatile acid is used for this precipitation, e. g., hydrochloric acid, the solution may be re-used directly by distilling off the excess acid rather than neutralizing it.

As solvent media for the reaction, organic polyhydroxy solvents have generally been found suitable, particularly glycerol and the lower alkylene glycols such as ethylene, and propylene, and butylene glycols. Other organic polyhydroxy compounds may be employed to promote the reaction even though they are not liquid under the conditions of the reaction. Such substances as for example the sugar alcohols mannitol, sorbitol, and inositol may be dissolved in a solvent and the solution will serve as the solvent medium for the reaction. Mixtures of suitable solvents and solutions may also be employed with no decrease in yield or efficiency. Those skilled in the art will readily appreciate that certain polyhydroxy compounds and solvents for such compounds may not be inert and may contain reactive groups which interfere with the course of the reaction. This inhibitory effect, if not altogether obvious and predictable from mere consideration of structure, can easily be determined by simple experiment, and it is not intended to cover such inoperative substances.

Other modifications of the process will suggest themselves to those skilled in the art and it is intended that such obvious modifications be embraced by the claims.

We claim as our invention:

1. A process for the preparation of citrazinamide which comprises reacting at elevated temperature urea and a member of the group consisting of citric and aconitic acids in the presence of a solvent medium comprising an inert organic polyhydroxy compound containing only carbon, hydrogen and oxygen atoms.

2. A process for the preparation of citrazinic acid which comprises reacting at elevated temperature urea and a member of the group consisting of citric and aconitic acids in the presence of a solvent medium comprising an inert organic polyhydroxy compound containing only carbon, hydrogen and oxygen atoms, precipitating the citrazinamide formed by neutralization of the reaction mass with acid, separating the precipitate and decomposing it with alkali to form a soluble of the alkali salt of citrazinic acid, and acidifying to precipitate purified citrazinic acid.

3. A cyclic process for the preparation of citrazinamide comprising reacting at elevated temperature urea and a member of the group consisting of citric and aconitic acids in the presence of a solvent medium comprising an inert organic polyhydroxy compound containing only carbon, hydrogen and oxygen atoms, neutralizing the reaction mass with dilute acid to precipitate the formed citrazinamide, separating the precipitate from the liquid, rendering the solution substantially neutral and recycling it as the solvent medium for additional preparations of citrazinamide.

4. The process of claim 1 wherein the urea is employed in substantial excess and is added in increments in the course of the reaction.

5. The process of claim 1 wherein the solvent medium is an alkylene glycol.

6. The process of claim 1 wherein the solvent medium is a solution of an inert organic polyhydroxy compound containing only carbon, hydrogen and oxygen atoms.

7. The process for the preparation of citrazinamide which comprises reacting at elevated temperature urea and citric acid monohydrate in the presence of an inert organic polyhydroxy solvent containing only carbon, hydrogen and oxygen atoms.

8. A process for the preparation of citrazinamide which comprises reacting at elevated temperature urea and aconitic acid in the presence of an inert organic polyhydroxy solvent containing only carbon, hydrogen and oxygen atoms.

9. A process for the preparation of citrazinamide which comprises reacting at elevated temperature urea and anhydrous citric acid in the presence of an inert organic polyhydroxy solvent containing only carbon, hydrogen and oxygen atoms.

10. A process for the preparation of citrazinamide which comprises reacting at elevated temperature urea and citric acid in a solution of an inert organic polyhydroxy compound containing only carbon, hydrogen and oxygen atoms.

11. A process for the preparation of citrazinamide which comprises reacting at elevated temperature urea and aconitic acid in a solution of an inert organic polyhydroxy compound.

12. A cyclic process for the preparation of citrazinic acid which comprises reacting a member of the group consisting of citric and aconitic acids with an excess of urea added in increments during the reaction at a temperature of about 130–133° C. in ethylene glycol as solvent, neutralizing the reaction mass with acid to precipitate citrazinamide, recycling the liquid after rendering it substantially neutral for re-use as solvent in the preparation of additional citrazinamide, decomposing the crude citrazinamide with alkali, and treating the decomposed citrazinamide with acid to precipitate citrazinic acid.

13. A cyclic process for the preparation of citrazinic acid which comprises reacting citric acid with an excess of urea added in increments during the reaction at a temperature of about 130–133° C. in ethylene glycol as solvent, neutralizing the reaction mass with acid to precipitate citrazinamide, recycling the liquid after rendering it substantially neutral for re-use as solvent in the preparation of additional citrazinamide, decomposing the crude citrazinamide with alkali, and treating the decomposed citrazinamide with acid to precipitate citrazinic acid.

14. A process for the preparation of citrazinamide which comprises reacting at elevated temperature urea and a member of the group consisting of citric and aconitic acids in the presence of ethylene glycol.

15. A process for the preparation of citrazinamide which comprises reacting at elevated temperature urea and a member of the group consisting of citric and aconitic acids in the presence of glycerol.

16. A process for the preparation of citrazinamide which comprises reacting at elevated temperature urea and a member of the group consisting of citric and aconitic acids in the presence of an aqueous solution of mannitol.

No references cited.